3,537,826
ALUMINUM MONOFLUORIDES AND
ADDUCTS THEREOF
Edward E. Flagg and Donald L. Schmidt, Midland, Mich.,
assignors to The Dow Chemical Company, Midland,
Mich., a corporation of Delaware
No Drawing. Filed Apr. 3, 1967, Ser. No. 627,861
Int. Cl. C01f 7/50; C07f 5/06
U.S. Cl. 23—367                                     4 Claims

ABSTRACT OF THE DISCLOSURE

The present invention is to novel substituted monofluoroalanes and tetrahydrofuran adducts thereof. These compounds are prepared by reacting a di-substituted alane with an acidic fluoride source material at relatively low temperatures in a tetrahydrofuran medium. The compounds as recovered from the reaction media are of high purity.

BACKGROUND OF THE INVENTION

The present invention relates to inorganic fluorides and more particularly is concerned with novel high purity substituted aluminum monofluorides (also referred to herein as monofluoroalanes), adducts thereof and to a method for their preparation.

Dialkyl fluoroalanes corresponding to the formula $R_2AlF$, wherein R is an alkyl group, have been studied and reported. [Ziegler et al., Annalen Chemie 608, 1 (1957); Laubengayer et al., J. Inorg. Chem. 5, 503 (1966).] Additionally, mixtures of aluminum chlorofluorides have been reported (U.S. 3,158,593) but these products usually are found to contain variable amounts of aluminum halide impurities associated therewith.

It is a principal object of the present invention to provide a novel process for directly preparing unique substituted aluminum monofluorides wherein the products as produced and recovered from the reaction mixture are substantially pure.

It is also an object of the present invention to provide a novel process for preparing new and useful substituted monofluoroalanes wherein substantially no undesirable by-products are simultaneously co-produced.

These and other objects and advantages readily will become apparent from the detailed description presented hereinafter.

SUMMARY

The novel compounds of the present invention comprise substantially pure substituted monofluoro-compounds of metals which form stable, stoichiometric hydrides or alkyls and strong fluorine bonds, and to adducts thereof. More particularly it is concerned with novel substituted monofluoroalanes corresponding to the empirical formula $X_2AlF$ and their tetrahydrofuran adducts corresponding to the empirical formula

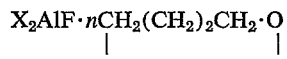

In these formulas, X is chloride, bromide, iodide, hydrogen, alkoxide or mixtures thereof and $n$ ranges from 0 to about 3. These compounds are prepared by reacting a disubstituted alane with an acidic fluoride source material, usually hydrogen fluoride or boron trifluoride, in tetrahydrofuran.

DESCRIPTION OF THE PREFERRED EMBODIMENT

Usually the present novel compounds are prepared by reacting a disubstituted alane, $X_2AlR'$, with hydrogen fluoride. Substituents X can be chloride, bromide, iodide, hydrogen, or alkoxide, wherein the saturated aliphatic or halo-substituted aliphatic group of the alkoxide has a total carbon content of from 1 to about 20. It is to be understood that the two substituents X can be either the same moiety or two different substituents can be present in the same molecule. R' is either hydrogen or a saturated aliphatic group having a total of from 1 to about 20 carbon atoms.

In actually carrying out the preparation of the substituted monofluoroalanes, usually a disubstituted alane reactant in tetrahydrofuran is reacted at a maximum temperature of about 25° C., ordinarily at from about minus 100 to about minus 40° C. and preferably about minus 70° C., under substantially anhydrous conditions with an acidic fluoride source material, usually hydrogen fluoride or boron trifluoride. The corresponding, high purity, substituted monofluoroalane or its tetrahydrofuran adduct crystallizes directly in the reaction mass, or is recovered upon removal of the carrier liquid.

The relative quantities of fluoride source material and alane reactant are such that there is substantially no replacement by fluoride of the X substituents of the alane but only of the hydrogen or alkyl group, i.e. R' substituent. Generally the amount of fluoride source material employed will range from about 99 to about 105 weight percent of that required stoichiometrically for hydrogen replacement in the alane.

Usually to assure optimum conversion a slight excess, about 5% greater than stoichiometric, of the fluoride source material is employed.

The initial disubstituted alane reactant readily is prepared by reacting an aluminum halide or aluminum alkoxide with one-half equivalent of aluminum hydride in an ether solution. The resulting substituted alane can be used directly in its reaction mixture to prepare a corresponding substituted monofluoroalane of the present invention. The present compounds also can be prepared by the metathesis reaction of aluminum halide with boron trifluoride, e.g. in ether.

Ordinarily in the practice of the present invention, a cyclic ether; e.g. tetrahydrofuran (THF) is employed as the reaction solvent and carrier liquid. However, it is to be understood that if other adducts are desired, other materials having coordinating groups such as normal ethers, trialkylamines, secondary and tertiary alkoxides and the the like, can be used in the practice of the invention.

The reactant solution concentrations to be employed are not critical. The maximum concentrations ordinarily used are those such that the reactants are completely dissolved therein at the operating conditions. Extremely dilute solutions are somewhat undesirable in that they are unwieldly to handle, require large storage and processing equipment, and can make the separation of the solid product a time-consuming operation. For most operations, reactant solutions ranging in concentration from about 0.001 to about 0.1 molar with respect to the reactant solutes are used.

For optimum product yield and purity, all processing operations, including the initial solution preparation, are carried out in a substantially anhydrous, inert atmosphere, e.g. nitrogen or argon. Also, all reactants and solvents preferably are dried so as to be substantially anhydrous prior to use in the process.

The substituted monofluoroalanes of the present invention are useful as catalysts in polymerization reactions. Also, they can be used as a reactant in the preparation of inorganic linear polymers containing F-Al-F bridged bonds in the backbone of the polymer. Such polymers exhibit good hydrolytic and thermal stability. Additionally, these can be reacted with phosphates to give phosphorus containing inorganic polymers.

EXAMPLE 1

Preparation of bis(tetrahydrofuran)dibromofluoroalane

About 0.015 gram mole of bis(tetrahydrofuran)dibromoalane, $$AlHBr_2 \cdot 2CH_2(CH_2)_2CH_2 \cdot O$$

was placed in a three-necked, one liter flask and 800 milliliters of tetrahydrofuran added thereto. These operations were carried out in a dry box. (The bis(tetrahydrofuran)dibromoalane reactant is readily prepared by mixing two equivalents of aluminum bromide in diethyl ether with one equivalent of aluminum hydride diethyl etherate carried in tetrahydrofuran.)

Following completion of the reactant addition to the flask, the reactor was removed from the dry box and connected to a substantially anhydrous nitrogen supply to assure no ingress of moisture into the reaction vessel. The vessel was fitted with a magnetic stirring bar and placed in a Dry Ice-methylene chloride cooling bath. This cooled and maintained the reactants at a temperature of about minus 70° C.

A hydrogen fluoride generator consisting of a Monel metal reaction tube, nitrogen gas inlet and polyethylene dip tube was charged with about 0.020 gram mole of sodium bifluoride ($NaHF_2$) pellets. This quantity is in a small excess of that required for stoichiometric reaction with the alane. The generator was attached to the reaction flask.

The reaction mass was agitated and hydrogen fluoride, generated by heating the Monel metal tube with a Bunsen burner, passed therethrough. The reaction of the alane with the hydrogen fluoride was rapid as indicated by an initial turbidness in the reaction mass and evolution of hydrogen. After the generation of hydrogen fluoride was completed, the system was purged with a slow stream of nitrogen and allowed to warm slowly to room temperature. The resulting clear product solution was placed in a dry box, filtered, and the solvent removed from the filtrate by evaporation at reduced pressure.

A pale yellow crystalline solid was recovered. Product yield was quantitative for the product dibromofluoroalane-ditetrahydrofuran etherate- $$[AlBr_2F \cdot 2CH_2(CH_2)_2CH_2 \cdot O]$$

Elemental analysis gave C, 26.55%; H, 4.36%; Al, 7.30%; Br, 45.41%; F, 3.85%. Theoretical calculated analysis for the indicated substituted monofluoroalane ditetrahydrofuranate is C, 27.44%; H, 4.61%; Al, 7.71%; Br, 45.65%; F, 5.43%.

The product readily redissolved in tetrahydrofuran and exhibited a low solubility in benzene.

Molecular weight determinations carried out using a tetrahydrofuran solution indicate the product is monomeric.

The compound also was shown to be isotypic with bis(tetrahydrofuran)bromoalane thus supporting the assigned structure.

EXAMPLE 2

Preparation of bis(tetrahydrofuran)dichlorofluoroalane

Aluminum chloride (0.49 gram mole, 65 grams) was dissolved in 100 milliliters of cold tetrahydrofuran and the resulting solution cooled to minus 70° C. in a Dry Ice-acetone bath. Boron trifluoride (0.308 gram mole, 22 grams) was added with concurrent stirring to this solution. The resulting reaction mixture was allowed to warm to 0° C. and held at this temperature for 6 hours. An additional 200 milliliters of tetrahydrofuran was added to the mixture and the solution kept at room temperature for about 48 hours. During this period colorless crystals formed in the reaction mass. These were collected and dried. The product yield was 50 grams, equivalent to about 39 percent of the product bis(tetrahydrofuran)dichlorofluoroalane.

$$AlCl_2F \cdot 2CH_2(CH_2)_2CH_2 \cdot O$$

Elemental analysis gave C, 36.37%; H, 6.30%; Al, 10.50%; Cl, 27.95%; F, 7.15%. Theoretical calculated analysis for this product is C, 36.80%; H, 6.18%; Al, 10.33%; Cl, 27.15%; F, 7.28%.

Molecular weight determination carried out in a tetrahydrofuran solvent indicated the compound was substantially monomeric.

X-ray diffraction analysis indicated that the compound $$AlCl_2F \cdot 2CH_2(CH_2)_2CH_2 \cdot O$$

was isotypic with bis(tetrahydrofuran)haloalanes thus supporting the assigned structure.

In a second study, bis(tetrahydrofuran)dichloroalane was reacted with hydrogen fluoride by generally following the procedure set forth in Example 1. X-ray diffraction data and elemental chemical analysis showed this compound was identical with that described directly hereinbefore.

EXAMPLE 3

Preparation of bis(tetrahydrofuran)diiodolane

Aluminum iodide (0.01 mole) was dissolved in cold diethyl ether, and aluminum hydride diethyl etherate (0.005 mole) was added. The total volume of diethyl ether was adjusted to 800 milliliters and thirty (30 ml.) milliliters of tetrahydrofuran was added. Hydrogen fluoride (~0.018 mole) was added to the stirred solution at 5° C. A white precipitate formed concurrently with this addition. An additional 50 ml. of tetrahydrofuran was added to the reaction mixture after the reaction was completed. The precipitated product was collected on a filter in the dry box.

X-ray diffraction analysis indicated the compound was amorphous.

Elemental analysis gave C, 21.85%; H, 3.65%; Al 6.31%; I, 56.2%; F, 4.6%. The calculated values for $$AlI_2F \cdot 2CH_2(CH_2)_2CH_2 \cdot O$$

are C, 21.63%; H, 3.63%; Al, 6.08%; I, 57.4%; F, 4.28%.

EXAMPLE 4

Preparation of bis(isopropyl)fluoroalane

Bis(isopropyl)alane, $[(CH_3)_2CHO]_2AlH$, was prepared by reacting aluminum isopropylate (0.014 mole) with aluminum hydride diethyl etherate, (0.007 mole) in 800 ml. of tetrahydrofuran. The resulting solution was cooled to minus 70° C., and hydrogen fluoride (~0.032 mole) was added. Hydrogen evolved but no precipitate was observed in the reaction mass. After filtering in a dry box, the product was isolated by solvent evaporation under reduced pressure.

A clear, glassy, amorphous material was isolated; the infrared spectrum indicated no Al-H bond. A melting point of 57–62° C. was recorded. Some solubility was observed in benzene and carbon tetrachloride. Elemental analysis gave C, 44.4%; H, 8.78%; Al, 16.4%; F, 10.03%. Calculated values for bis(isopropyl)-fluoroalane, $[(CH_3)_2CHO]_2AlF$ are C, 43.9%; H, 8.60%; Al, 16.3%; F, 11.6%.

EXAMPLE 5

Preparation of isopropylfluoroalane

Isopropylalane, $AlH_2(OCH(CH_3)_2)$, was prepared by reacting aluminum isopropylate (0.007 mole) with aluminum hydride etherate (0.014 mole) in 800 ml. of tetrahydrofuran. The solution was cooled to minus 70° C., and hydrogen fluoride (~0.028 mole) was added.

An amorphous white solid was isolated by removing the solvent under reduced pressure. An Al-H stretching band was observed at 1820 cm.$^{-1}$. Elemental analysis gave C, 36.25%; H, 7.70%; Al, 23.1%; F, 15.6%. The calculated values for isopropyl fluoroalane, AlHF(OC$_3$H$_7$), with 0.1 molecule of tetrahydrofuran associated therewith are C, 36.04%; H, 7.83%; Al 23.81%; F, 16.8%.

EXAMPLE 6

Preparation of mono(tetrahydrofuran)bromofluoroalane

Bis(tetrahydrofuran)bromoalane,

AlH$_2$Br·2CH$_2$(CH$_2$)$_2$CH$_2$·O 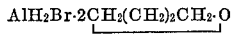

(0.24 mole) was dissolved in 800 ml. tetrahydrofuran, cooled to minus 70° C., and hydrogen fluoride (0.024 mole) was added.

An amorphous white solid was isolated from the product solution by removing the solvent under reduced pressure. An Al-H stretching band was observed near 1840 cm.$^{-1}$. Elemental analysis gave C, 25.9%; H, 4.82%; Br, 37.43%; F, 7.3%; Al, 12.38%. The calculated values for bromofluoroalane with 1.1 molecule of tetrahydrofuran, AlBrHF·1.1CH$_2$(CH$_2$)$_2$CH$_2$·O 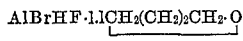

are C, 25.6%; H, 4.78%; Br, 38.37%; F, 9.21%; Al, 13.08%.

In a manner similar to that described for the foregoing examples, alkoxide substituted monofluoroalanes wherein the aliphatic group of the alkoxide radical is a halo-substituted group, and in particular a perhalosubstituted group, readily can be prepared in accordance with the present invention.

Various modifications can be made in the present invention without departing from the spirit or scope thereof for it is understood that we limit ourselves only as defined in the appended claims.

We claim:
1. Substituted monofluoroalanes·tetrahydrofuranates corresponding to the empirical formula

X$_2$AlF·$n$CH$_2$(CH$_2$)$_2$CH$_2$·O 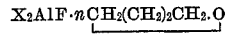

wherein X is a member selected from the group consisting of chloride, bromide, iodide, hydrogen and alkoxide, said alkoxide being a saturated aliphatic or halosubstituted aliphatic group having a total carbon content of from 1 to about 20 and mixtures thereof and $n$ is greater than 0 but less than 3.

2. A process for preparing monofluoroalanes corresponding to the empirical formula X$_2$AlF which comprises:

reacting in tetrahydrofuran at a maximum temperature of about 0° C. a disubstituted alane with hydrogen fluoride, said reactant concentrations in the inert solvent falling within the range of from about 0.001 to about 0.1 molar, said disubstituted alane corresponding to the empirical formula X$_2$AlR' wherein each X is independently selected from the group consisting of chloride, bromide, iodide, and hydrogen and alkoxide, said alkoxide being a saturated aliphatic or halosubstituted aliphatic group having a total carbon atom content of from 1 to about 20 and R' is a member selected from the group consisting of hydrogen or saturated aliphatic groups having a total of from 1 to about 20 carbon atoms, and recovering a high purity disubstituted monofluoroalane directly from the reaction mixture.

3. The process as defined in claim 2 wherein the amount of hydrogen fluoride employed is about 105 weight percent of that required stoichiometrically for reaction with the alane.

4. The process as defined in claim 3 wherein the process is carried out at a temperature of about minus 70° C.

References Cited

UNITED STATES PATENTS

| | | | |
|---|---|---|---|
| 2,656,243 | 10/1953 | Bragdon | 23—365 |
| 2,286,129 | 6/1942 | Veltman | 23—93 X |
| 3,158,593 | 11/1964 | Calfee | 23—88 |
| 3,185,547 | 5/1965 | Hunt | 23—204 |

OSCAR R. VERTIZ, Primary Examiner

G. O. PETERS, Assistant Examiner

U.S. Cl. X.R.

23—365; 260—448